United States Patent
Harada

[11] Patent Number: 5,963,338
[45] Date of Patent: Oct. 5, 1999

[54] METHOD AND APPARATUS FOR CALIBRATING MULTI-ELEMENT SENSORS

[75] Inventor: Hisashi Harada, Tokyo, Japan

[73] Assignee: NEC Corporation, Japan

[21] Appl. No.: 08/886,703

[22] Filed: Jul. 1, 1997

Related U.S. Application Data

[63] Continuation of application No. 08/680,124, Jul. 15, 1996, abandoned.

[30] Foreign Application Priority Data

Jul. 19, 1995 [JP] Japan ................................ 7-182309

[51] Int. Cl.$^6$ ............................ H04N 1/00; H04N 1/04
[52] U.S. Cl. ........................................... 358/406; 358/482
[58] Field of Search ...................... 358/482, 483, 358/406, 504, 446, 443, 513, 530; 250/208.1; 348/250, 244, 243, 241, 257

[56] References Cited

U.S. PATENT DOCUMENTS

| | | | |
|---|---|---|---|
| 5,317,423 | 5/1994 | Harada | 358/482 |
| 5,337,163 | 8/1994 | Kawamoto et al. | 358/483 |
| 5,473,660 | 12/1995 | Bastiaens et al. | 348/250 |

*Primary Examiner*—Edward L. Coles
*Assistant Examiner*—Chenkfan Lee
*Attorney, Agent, or Firm*—Ostrolenk, Faber, Gerb & Soffen, LLP

[57] ABSTRACT

A method and apparatus for subjecting multi-element sensing apparatuses to electric calibration whenever necessary, regardless of whether the subject under being photographed is well or poorly lit. The apparatus comprises a photoreceptor section having n photosensors, a transfer gate placed along the photoreceptor section, a register for temporarily storing image signals, an input drain provided at one end of the register, a CCD-driving circuit for adjusting timing of respective driving pulses, and a circuit for generating electric calibration signals. The input drain is ON/OFF controlled to input electric calibration signals while image signals are being outputted when the transfer gate is OFF, and the CCD-driving circuit adjusts timing of respective driving pulses so that zero-level signals and the electric calibration signals are simultaneously outputted after the image signals.

8 Claims, 7 Drawing Sheets

METHOD AND APPARATUS FOR CALIBRATING MULTI-ELEMENT SENSORS

This is a Continuation of application Ser. No. 08/680,124, filed on Jul. 15, 1996 now abandoned.

BACKGROUND OF THE INVENTION

1. Field of the Invention

The present invention relates to a method and apparatus for calibrating high-resolution multi-element sensors which are mounted in artificial satellites or the like for earth observation, or in facsimile machines or the like for detecting optical images, etc.

2. Description of the Prior Art

Multi-element sensing apparatuses mounted in facsimile machines, artificial satellites, etc. perform electric calibration at regular time intervals to keep track of the operational state of electric circuits throughout the equipment while detecting image signals. Multi-element sensing apparatuses of the prior art are designed to receive image signals when the subject being photographed is well lit, and to perform electric calibration while the subject being photographed is poorly lit.

Particularly, in the multi-element sensing apparatuses used for the artificial satellites, electric calibration signals having a predetermined level are applied to a CCD part in the sensing apparatuses in an observation-off time and the resultant calibration output signals are transmitted to an earth station as the same as observation output signals (image signals). In the earth station, the observation output signals are calibrated using the resultant calibration output signals. FIG. 7 schematically shows such image signals in time sequence, including outputted image signals 16, outputted electric calibration signals 18, and outputted zero (or offset)-level signals 17. As illustrated therein, all the image signals 16, the electric calibration signals 18 and the zero (or offset)-level signals 17 are outputted to the same-numbered pixels.

With conventional multi-element sensing apparatuses of this type, electric calibration is performed only when the subject being photographed is placed under low light conditions, since electric calibration for the subject being photographed in lit places results in overlapping of image signals on electric calibration signals. Therefore, some limits are imposed on the timing of the performance of electric calibration, resulting in the drawback of preventing calibration measurements whenever necessary. Further, according to the conventional apparatuses, it is impossible to realize accurate and continuous calibration when a condition such as temperature is changed during an observation time.

To improve such conventional apparatus, a technique applying a particular register having additional stages for calibration sequences is disclosed in U.S. Pat. No. 5,317,423. However, this technique requires a special sensing device having such additional stages which is disadvantageous with respect to circuit configuration and cost.

SUMMARY OF THE INVENTION

It is therefore an object of the present invention to provide a method and apparatus for subjecting multi-element sensors to electric calibration at all time, which never requires a special circuit configuration, i.e., an additional register stages.

In order to accomplish the above object, the method of calibrating multi-element sensors according to the present invention comprises: first outputting image signals which have been subjected to photoelectric conversion to a register for temporary storage, during which time an input drain is OFF; outputting the image signals to an amplifier circuit through ON/OFF operations of the register after the image signals have been outputted to the register; inputting electric calibration signals through ON/OFF control of the input drain while the image signals are being outputted to the amplifier circuit from the register when the transfer gate is OFF; and adjusting timing of respective driving pulses through a CDD-driving circuit so that zero-level signals and the electric calibration signals are outputted after the image signals. According to the present invention, a change in the sensitivity of the image signals is detected and calibrated in an accurate and continuous manner, with reference to the zero-level signals and the electric calibration signals.

An apparatus for use in the method comprises:

a photoreceptor section composed of an array of a plurality of photosensors; a CCD register for temporarily storing image signals which have been subjected to photoelectric conversion in the photoreceptor section; a transfer gate for ON/OFF connection of charge from the photoreceptor section to the register; an input drain provided at one end of the register for inputting electric calibration signals to the register; an amplifier circuit for amplifying weak signals; a multiplexer circuit for synthesizing signals from a plurality of amplifier circuits of the same type as the aforementioned amplifier circuit; an A/D conversion circuit for converting signals inputted through the multiplexer circuit into digital signals; a memory circuit for storing the digital signals; a pulse-generating circuit connected to the A/D conversion circuit; a CCD-driving circuit connected to the pulse-generating circuit, capable of adjusting timing of respective driving pulses so that zero-level signals and the electric calibration signals are outputted after the image signals; and a circuit for generating the electric calibration signals which are outputted via the register.

Figure 3:
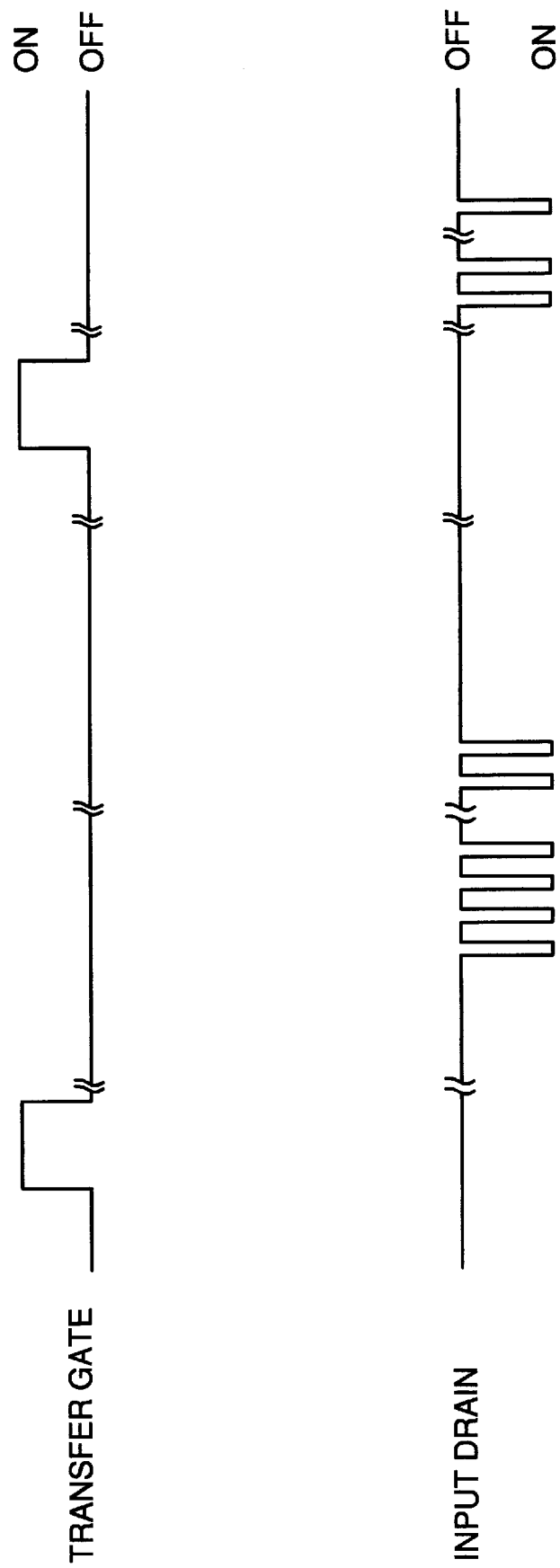
FIG. 3 is a timing waveform chart of the transfer gate and the input drain.

When image signals are being inputted to the register, the input drain is normally placed in the OFF position to prevent electric calibration signals from entering the register via the input drain. On the other hand, in order to input electric calibration signals to the register, the calibration signals are inputted when the input drain, which undergoes repeated ON/OFF operations as illustrated in FIG. 3, is ON. During this period of time, the transfer gate is placed in the OFF position to ensure that no image signals enter the register through the transfer gate.

Figure 4:
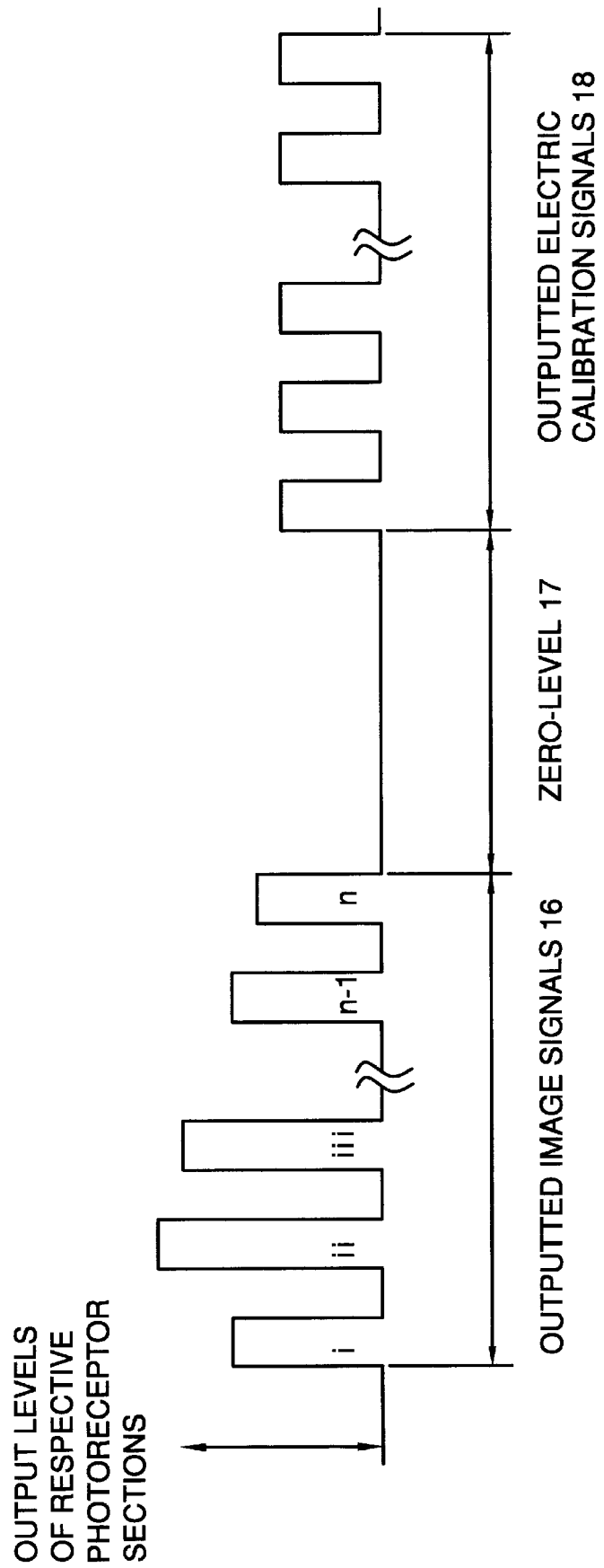
FIG. 4 is a chart of waveform of output from the multi-element sensing apparatus when the temperature and other parameters are stable.

According to the present invention, one lineful of output from the register includes the image signals and the zero (or offset)-level signals and the electric calibration signals at an even level, as illustrated in FIG. 4.

DESCRIPTION OF THE PREFERRED EMBODIMENTS

Figure 1:
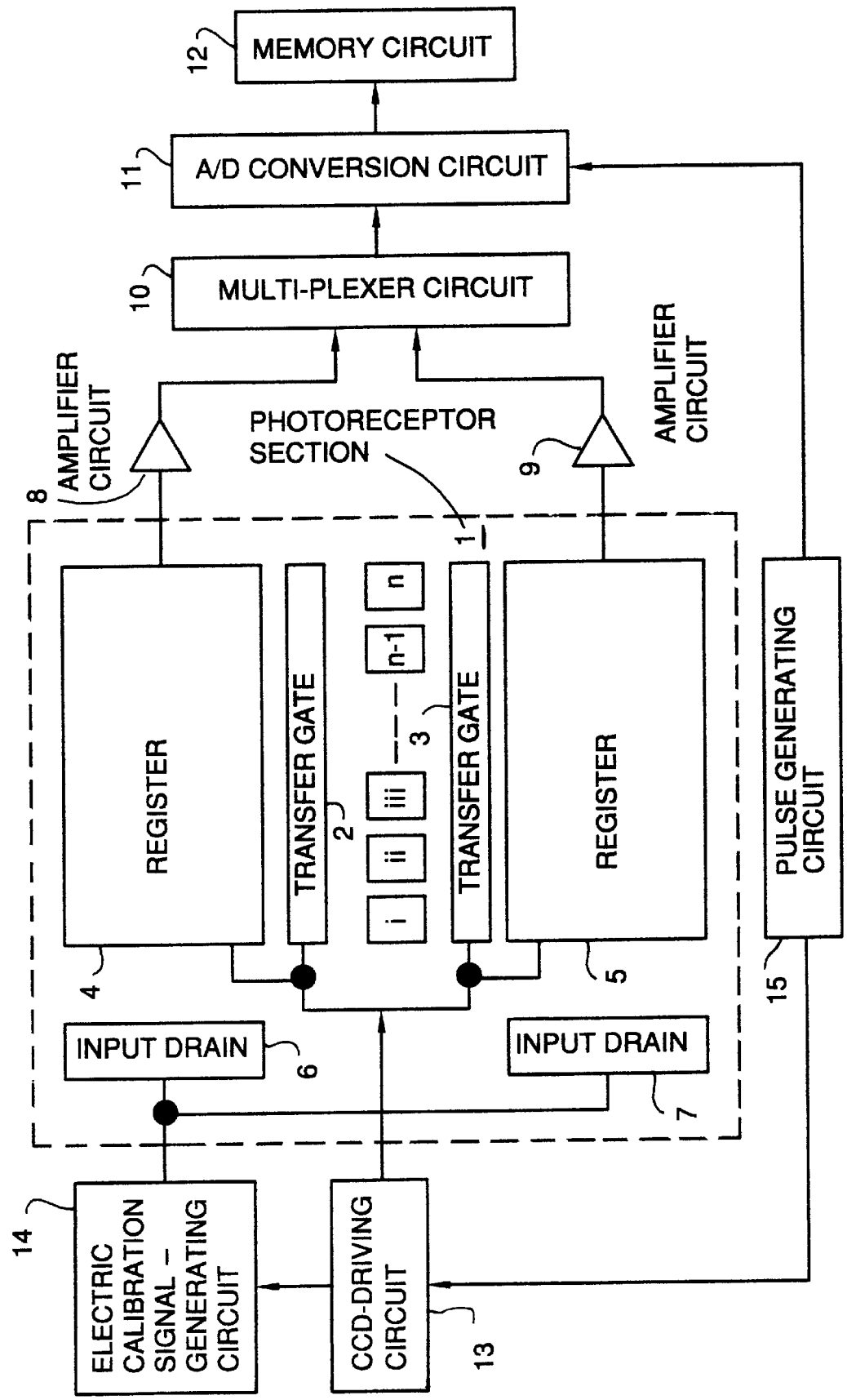
FIG. 1 is a circuit diagram illustrative of an embodiment of a multi-element sensor-calibrating apparatus according to the present invention.
Figure 2:
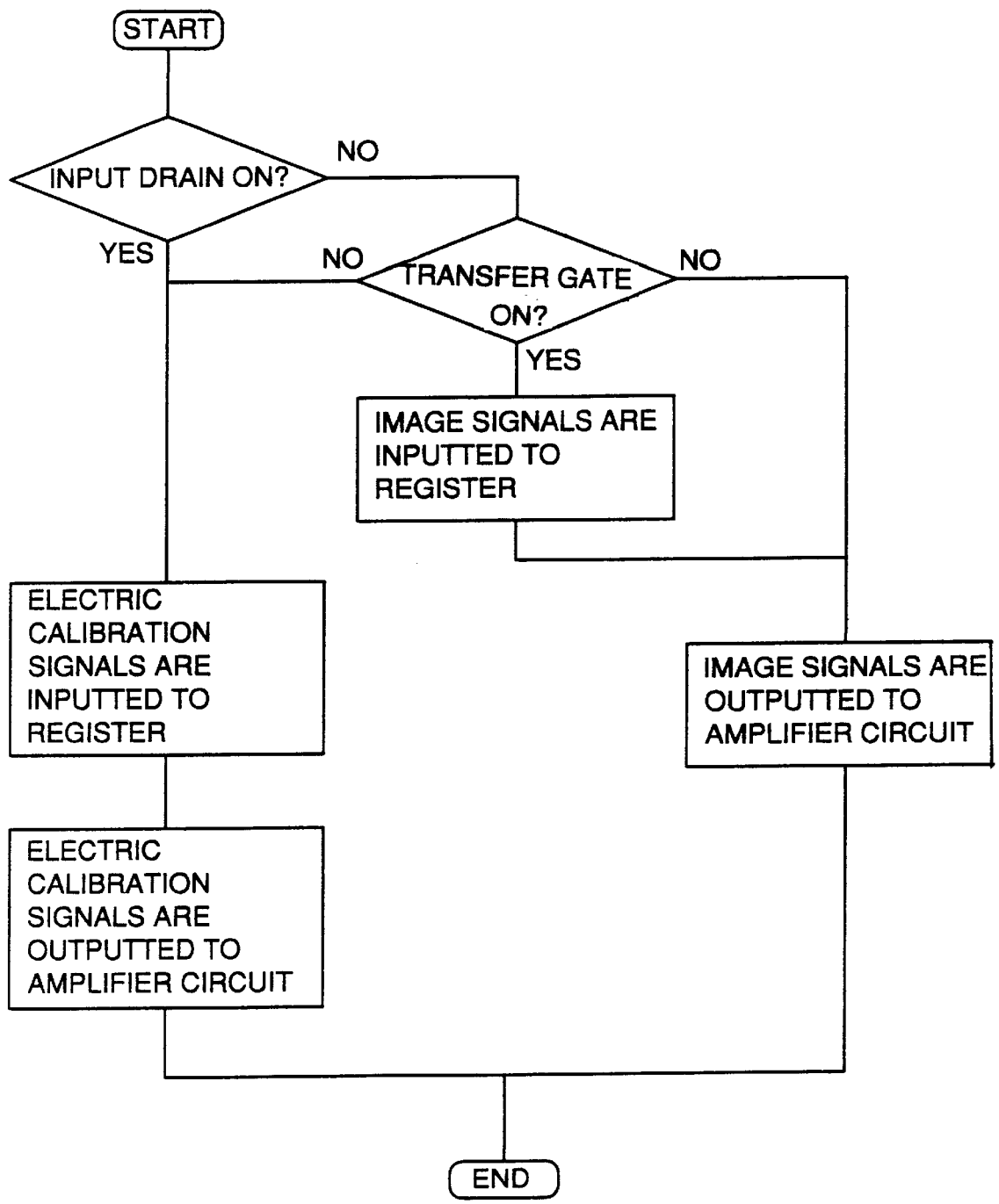
FIG. 2 is a flow chart illustrative of a method for calibrating multi-element sensors according to the present invention.

The present invention will now be explained with reference to the drawings. In FIG. 1 showing an embodiment of a multi-element sensor-calibrating apparatus according to the present invention, the embodiment comprises a photoreceptor section 1 composed of a plurality of photosensors, "n" photosensors numbered from "i" to "n" in the case shown here, transfer gates 2 and 3 arranged along the photoreceptor section 1, CCD registers 4 and 5 placed opposite to the photoreceptor section 1 across the transfer gates 2 and 3, and input drains 6 and 7 provided at one end of each registers. In FIG. 1, the two sets, which include the transfer gate 2, the register 4 and the input drain 6, and the transfer gate 3, the register 5 and the input drain 7, are arranged for odd-numbered photosensors and even-numbered photosensors in the photoreceptor section 1, respectively. There is also provided a CCD-driving circuit 13 which generates CCD-driving pulses for activating the transfer gates 2 and 3, and the registers 4 and 5.

With the configuration illustrated in FIG. 1, for example, signals which have undergone photoelectric conversion and been stored in the photoreceptor section 1 are transferred to the register 4 while the transfer gate 2 is ON, and are successively transferred to an amplifier circuit 8 in response to transfer clock signals from the CCD-driving circuit 13 after the transfer gate 2 has been switched to the OFF position. After several stages of signals have been transferred, the input drain 6 is switched from the OFF (low-level) state to ON/OFF control, and this triggers inputting of electric calibration signals through the input drain 6 which are then transferred to the amplifier circuit 8 successively in response to transfer clock signals. The foregoing operation also applies to the combination of the transfer gate 3, the register 5, the input drain 7 and the amplifier circuit 9.

The amplifier circuits 8 and 9 amplify the weak signals. The amplified signals of the odd-numbered and even-numbered photosensors delivered from the amplifier circuits 8 and 9 are then synthesized in a multiplexer circuit 10 and sent to an A/D conversion circuit 11 which converts the inputted synthesized signals into digital signals. The digital signals are stored in a memory circuit 12. In addition, a pulse-generating circuit 15 generates clocks for the A/D conversion circuit 12. Also provided is an electric calibration signal-generating circuit 14 which is connected to the input drains 6 and 7.

FIG. 3 illustrates timing waveforms of the transfer gate and the input drain according to the present invention.

When the transfer gate is ON (at the high level), the input drain is OFF (at the low level), and after the transfer gate has been switched to the OFF (low-level) state, and a plurality of stages of clock signals have been transferred, the input drain is ON/OFF controlled to input electric calibration signals to the register.

FIG. 4 illustrates the outputted state of image signals and electric calibration signals in time sequence. The first half of the output consists of image signals of respective photosensors "i" through "n", and after the signals have been outputted, several stages of zero (offset)-level image signals are outputted, after which the electric calibration signals are outputted.

Output levels of the respective photoreceptor sections are plotted along the axis of ordinates. The image signals are outputted at various levels depending on the subject being photographed, whereas the electric calibration signals are inputted through the input drain at an even level, and the zero (offset)-level signals are also at an offset level, since neither image signals nor electric calibration signals are inputted during that time.

Figure 5:
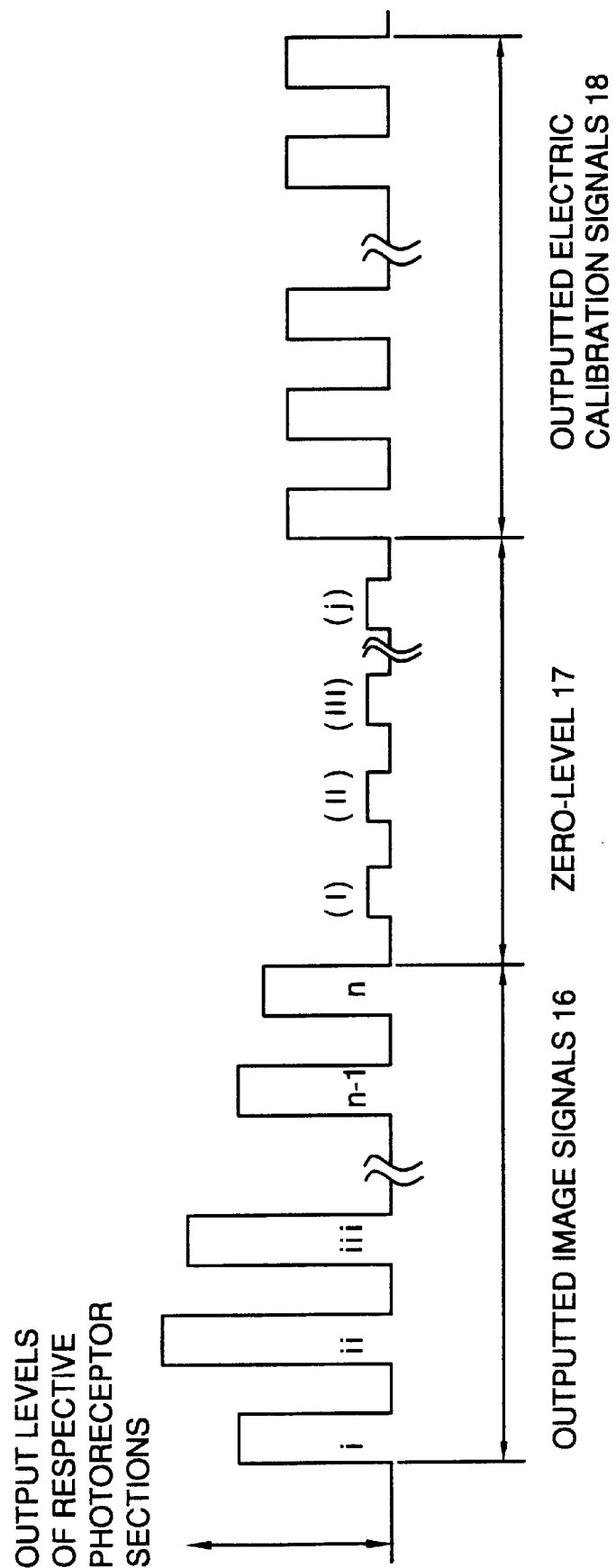
FIG. 5 is a chart of waveform of output from the multi-element sensing apparatus when outputted image signals have been changed due to change in the temperature and other parameters.
Figure 6:
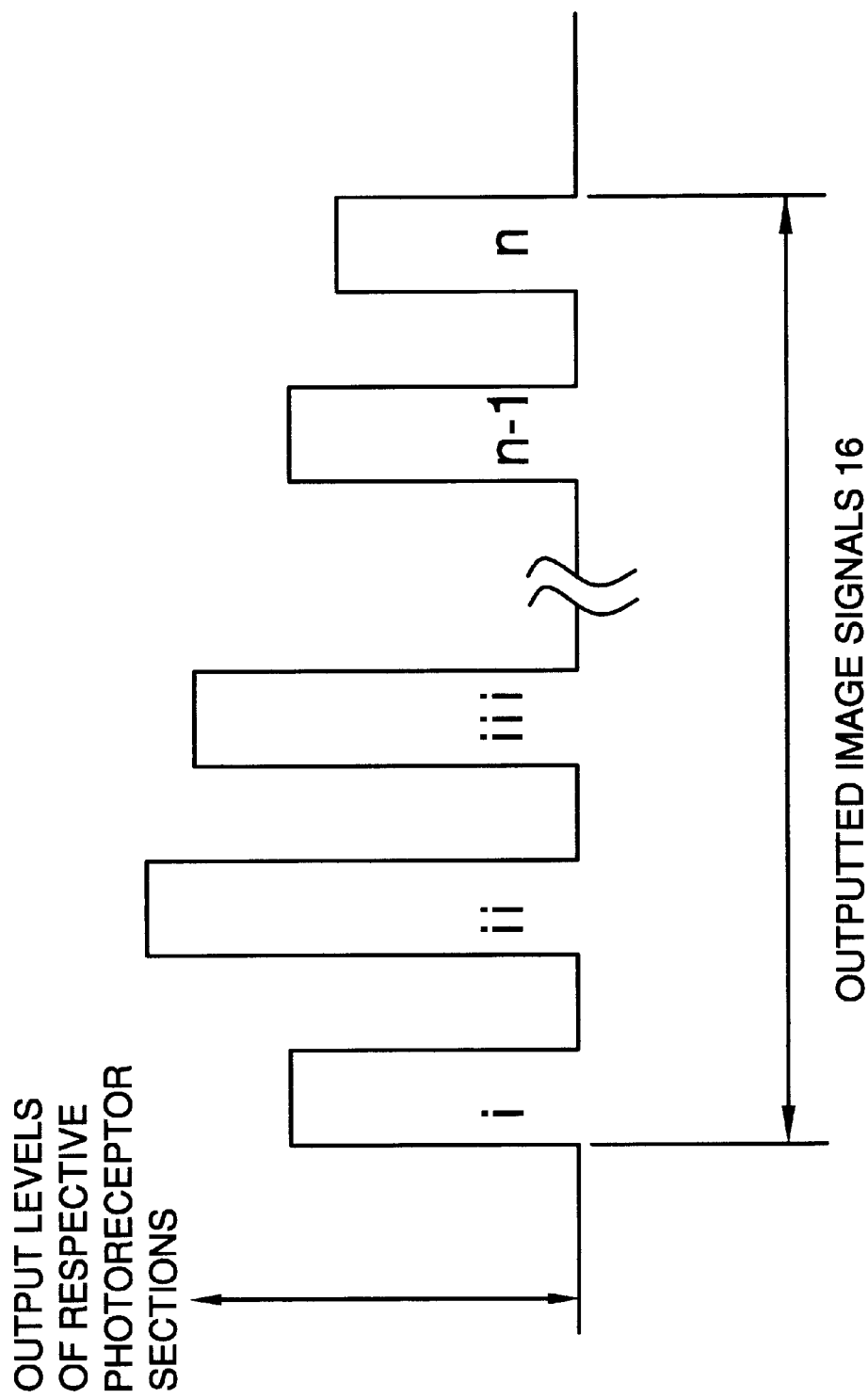
FIG. 6 is a view of waveform of outputted image signals after compensation for changes due to the temperature and others.
Figure 7:
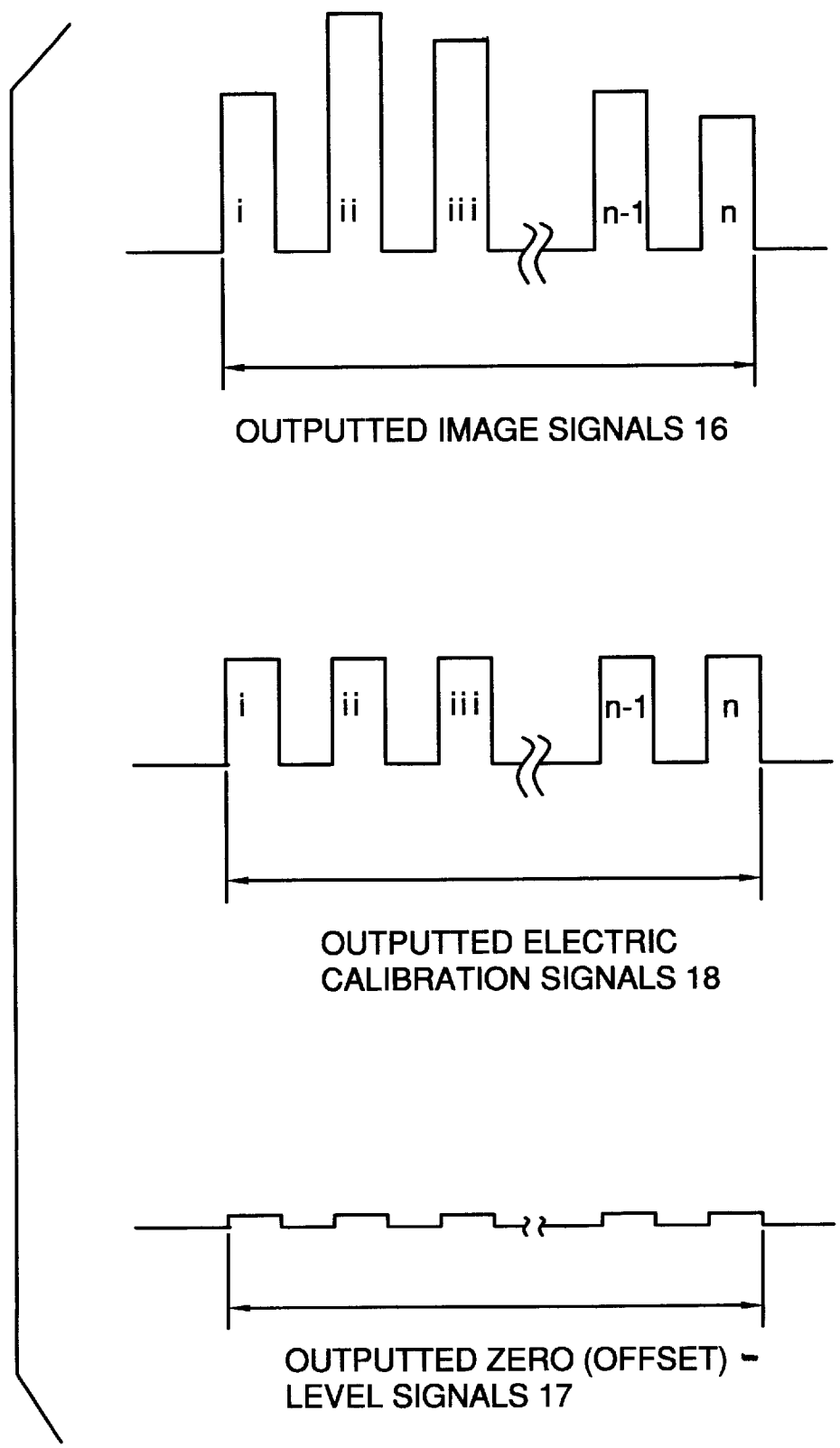
FIGS. 7 is a view illustrative of image signals, calibration signals and offset level signals in time sequence, from a multi-element sensing apparatus of the prior art.

Even in cases where fluctuations of the image signals are caused by change in the temperature and other parameters of the CCD, the circuit sections, etc., as shown in FIG. 5, setting of the zero level 17 and the level of the outputted electric calibration signals 18 as two reference levels allow detection of the difference between the zero (or offset) level and the gain of the entire multi-element sensing apparatus, and thus one lineful of image signals may be easily corrected as shown in FIG. 6.

In the foregoing explanation, the electric calibration signals according to the present invention are at a fixed level, nevertheless, the present invention may be applied to various levels as well.

As described above, according to the present invention, since the design is such that electric calibration signals are inputted to the register through the input drain while the transfer gate is OFF, and image signals are inputted to the register while the transfer gate is ON, simultaneous output of the image signals, the electric calibration signals and the zero (offset) level signals allows calibration of the image signals whenever necessary, even when the outputted image signals fluctuate due to changes in the temperature and other parameters.

What is claimed is:

1. A method for calibrating multi-element sensing apparatus having a plurality of photosensors, a register means arranged along said plurality of photosensors, said register means having a plurality of stages corresponding to said plurality of photosensors, a transfer gate disposed between said plurality of photosensors and said register means and an input drain provided at an end of said register means, said method comprising the steps of:

transferring image signals from said plurality of photosensors through said transfer gate to said register means while said transfer gate is in an ON state;

shifting said image signals through said register means to deliver said image signal while said transfer gate is inhibited;

inputting a calibration signal through said input drain into said register means when a predetermined time period elapses after said image signals are shifted through said register means while said transfer gate is inhibited;

sequentially receiving said image signal, offset signals, and said calibration signal from said register means said offset signals being received from said register means during said predetermined time period while said input drain is in an OFF state.

2. An apparatus for calibrating multi-element sensor, comprising:

a plurality of photosensors arrayed in a line;

a CCD register means arranged along said plurality of photosensors for receiving image signals from said plurality of photosensors, said CCD register means having a plurality of stages corresponding to said plurality of photosensors;

a transfer gate disposed between said plurality of photosensors and said CCD register means for allowing transfer of said image signal from said plurality of photosensors to said CCD register means;

an input drain coupled to said CCD register means for inputting a calibration signal into said CCD register means;

a means for generating said calibrating signal having a predetermined level; and control means for controlling said CCD register means, said transfer gate and said input drain such that said calibration signal is inputted into said CCD register means when a predetermined time period elapses after said image signals are transferred through said CCD register means.

3. An apparatus for calibrating multi-element sensor as claimed in claim 2, further comprising a storing means for storing said image signals, offset signals, and said calibration signal which are sequentially delivered from said CCD register means, said offset signals being delivered from said CCD register means during said predetermined time period.

4. An apparatus for calibrating multi-element sensor as claimed in claim 2, further comprising:

a second CCD register means arranged along said plurality of photosensor at an opposite side to said first CCD register means, said first and second CCD register means receiving image signals from odd-numbered photosensors and even-numbered photosensors, respectively;

a second transfer gate disposed between said plurality of said photosensors and said second CCD register means;

a second input drain coupled to said second CCD register means for inputting a calibrating signal into said second CCD register means; and a mixing means for mixing output signals from said first and second CCD register means.

5. An apparatus for calibrating multi-element sensor as claimed in claim 4, further comprising a storing means for storing said image signals, offset signals and said calibration signal in a sequential manner, said offset signals being received from said CCD register means during said predetermined time period.

6. An apparatus for calibrating multi-element sensor as claimed in claim 2, wherein said control means controls said transfer gate to be ON-state and said input drain to be inhibited when said image signal is transferred from said plurality of photosensors to said CCD register means, controls said transfer gate to be inhibited and said input drain to be inhibited during said predetermined time period, and controls said transfer gate to be inhibited and said input drain to be ON-state when said calibration signal is inputted into said CCD register means.

7. A method for calibrating a multi-element sensing apparatus having a plurality of photosensors, a register coupled to said plurality of photosensors and having a plurality of storage elements in one to one correspondence to said plurality of photosensors, a transfer gate coupled to said plurality of photosensors and to said register, and an input drain coupled to said register, said method comprising the steps of:

enabling said transfer gate;

transferring image signals from said plurality of photosensors to said register means in response to said enablement of said transfer gate;

disabling said transfer gate after said transfer of said image signals to said register;

outputting said image signals from said register after said transfer gate has been disabled;

outputting offset signals from said register for a predetermined period of time after said outputting of said image signals has been completed;

inputting a calibration signal in said register through said input drain after said predetermined time period has elapsed; and outputting said calibration signals from said register.

8. An apparatus for calibrating multi-element sensor, comprising:

a plurality of photosensors generating image signals;

a CCD register coupled to said plurality of photosensors, said CCD register having a plurality of storage elements in one to one correspondence to said plurality of photosensors, said CCD register outputting offset signals in the absence of other signals in CCD register;

a transfer gate coupled to said plurality of photosensors and coupled to said CCD register, said transfer gate transferring said image signals from said plurality of photosensors to said CDD register;

an input drain coupled to said CCD register, said input drain inputting calibration signals into said CCD register; and a controller coupled to said CCD register, said transfer gate and said input drain, said controller controlling said CCD register, said transfer gate and said input drain such that said CCD register sequentially outputs said image signals said offset signals and said calibration signals.

* * * * *